United States Patent
Chen

(10) Patent No.: US 7,369,620 B2
(45) Date of Patent: May 6, 2008

(54) CHANNEL NOISE ESTIMATING METHOD AND APPARATUS APPLIED TO A MULTI-CARRIER SYSTEM

(75) Inventor: Hung Kun Chen, Hsinchu (TW)

(73) Assignee: Mediatek Incorporation, Hsinchu (TW)

( * ) Notice: Subject to any disclaimer, the term of this patent is extended or adjusted under 35 U.S.C. 154(b) by 711 days.

(21) Appl. No.: 10/724,742

(22) Filed: Dec. 2, 2003

(65) Prior Publication Data

US 2005/0117657 A1     Jun. 2, 2005

(51) Int. Cl.
*H04K 1/10* (2006.01)
*H04L 27/28* (2006.01)

(52) U.S. Cl. .................. 375/260; 375/136; 375/144; 375/148; 375/346; 375/347; 375/348; 375/349; 375/350

(58) Field of Classification Search .............. 375/260, 375/346–350, 136, 144, 148
See application file for complete search history.

(56) References Cited

U.S. PATENT DOCUMENTS

| 5,280,284 | A  | * | 1/1994  | Johler .................. 342/22 |
| 5,406,569 | A  | * | 4/1995  | Isozaki .................. 714/775 |
| 6,611,513 | B1 | * | 8/2003  | ten Brink ............... 370/342 |
| 2001/0044915 | A1 | * | 11/2001 | Vandersteen et al. ..... 714/704 |
| 2002/0013164 | A1 | * | 1/2002  | Leifer et al. ............ 455/562 |
| 2004/0052306 | A1 | * | 3/2004  | Ibrahim et al. ........... 375/152 |
| 2005/0063493 | A1 | * | 3/2005  | Foster ................... 375/329 |

\* cited by examiner

*Primary Examiner*—Curtis Odom
(74) *Attorney, Agent, or Firm*—Bacon & Thomas, PLLC

(57) ABSTRACT

A channel noise estimating method and apparatus applied to a multi-carrier system are disclosed, where data symbols received by a receiving unit are applied to reconstruct the original transmitted data symbols. The reconstructing process is performed by either a soft decision or a hard decision technique to simulate the original transmitted data symbols. These simulated transmitted data symbols in company with the received data symbols are further applied to calculate the channel noise based on an LMS algorithm.

11 Claims, 8 Drawing Sheets

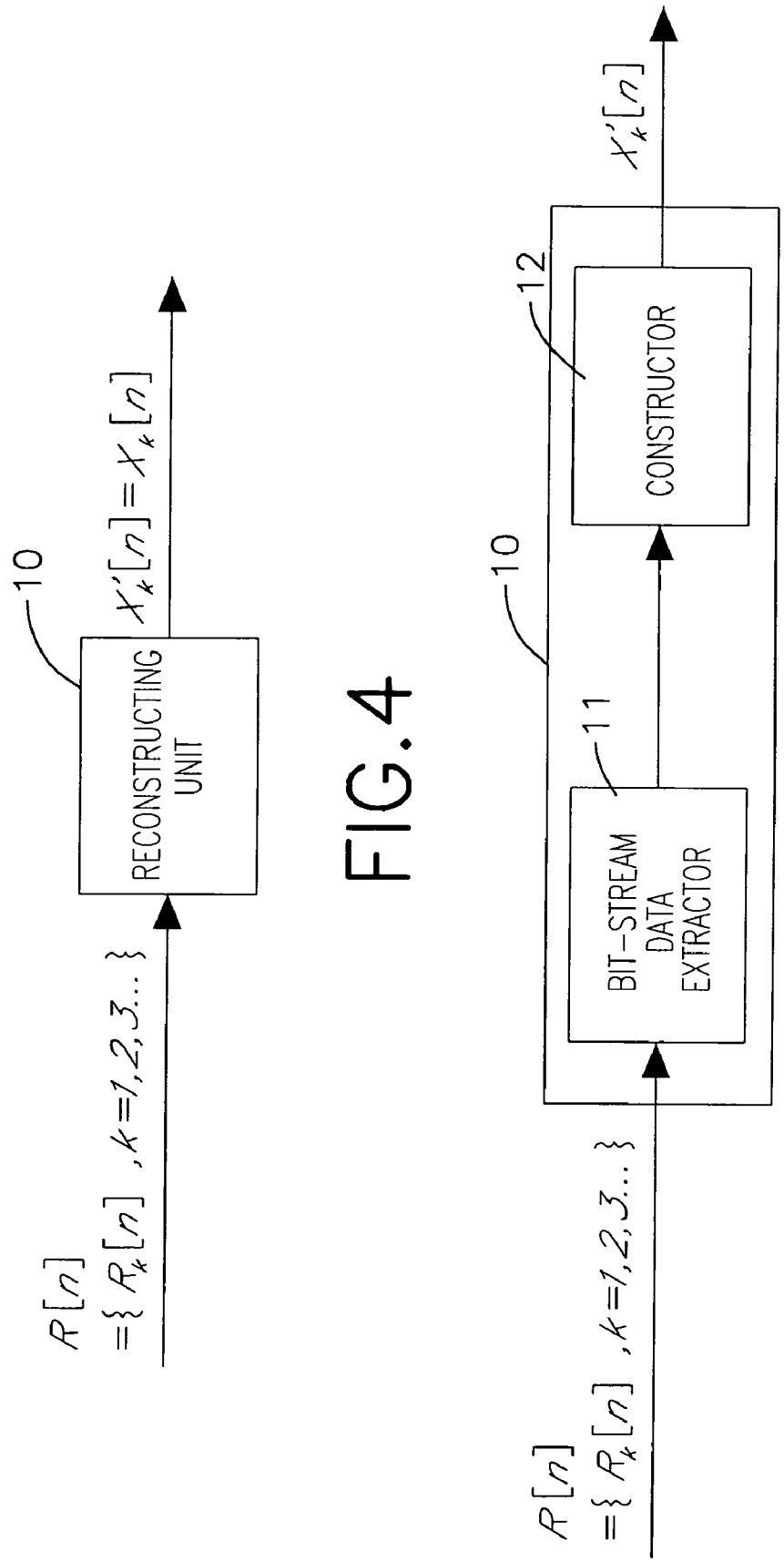

CHANNEL NOISE ESTIMATING METHOD AND APPARATUS APPLIED TO A MULTI-CARRIER SYSTEM

BACKGROUND OF THE INVENTION

1. Field of the Invention

The present invention relates to a channel noise estimating method and apparatus applied to a multi-carrier system, and more particularly to a method and an apparatus that dynamically tracks the channel noise so as to obtain the channel status in real time.

2. Description of Related Art

Although high-bandwidth wired communication channels, such as optical fiber communication channels are becoming more common for transmitting high-quality data, the wireless communication will still retain significant importance for the foreseeable future.

In general, data transmission quality and correctness of the wireless communication system are the points of most concern. The communication channel may be influenced by surrounding conditions so that the continuous estimation of the channel quality is necessary to guarantee that the received data is correct. The estimation of data transmission quality can be derived from two aspects, the channel response (gain) and channel noise. The channel response estimation manner has been widely proposed and discussed, however, the channel noise quantity, the other essential factor for appraising the communication channel is not often addressed. Accordingly, it is desirable to provide a method and an apparatus for estimating the channel noise quantity.

SUMMARY OF THE INVENTION

An objective of the present invention is to provide a method and an apparatus for estimating the channel noise of a multi-carrier system consisting of K subchannels, where the channel noise quantity of each subchannel can be estimated in real time.

To achieve aforementioned objective, the method in accordance with the present invention mainly comprises the acts of:

reconstructing simulated input data symbols ($X'_k[n]$) that simulate the original data symbols ($X_k[n]$);

delaying the actual received data symbols ($R_k[n]$) such that the delayed actual received data symbols ($Q_k[n]$) are synchronous to the simulated input data symbols ($X'_k[n]$);

calculating a channel response estimate ($W_k[n]$) of one subchannel k based on said delayed actual received data symbols ($Q_k[n]$) and said simulated input data symbols ($X'_k[n]$) according to the Least Mean Square algorithm;

estimating virtual received data symbols ($Y_k[n]$) based on said channel response estimate ($W_k[n]$) and the simulated input data symbol ($X'_k[n]$);

calculating a different quantity ($e_k[n]$) between the delayed actual received data symbol ($Q_k[n]$) and the estimated virtual received data symbols ($Y_k[n]$) to represent the channel noise of said subchannel k.

Other objects, advantages and novel features of the invention will become more apparent from the following detailed description when taken in conjunction with the accompanying drawings.

BRIEF DESCRIPTION OF THE DRAWINGS

FIG. 4 shows a reconstructing process, while the original data symbols Xk[n] are exactly known to the receiver;

FIG. 5 shows a basic configuration of a reconstructing unit in accordance with the present invention;

DETAILED DESCRIPTION OF PREFERRED EMBODIMENT

The present invention is to provide a method and an apparatus for estimating channel noise. More particularly, the method and the apparatus are applied to a multi-carrier system consisting of multiple subchannels such as an OFDM (orthogonal frequency division multiplexing) system.

Figure 1:
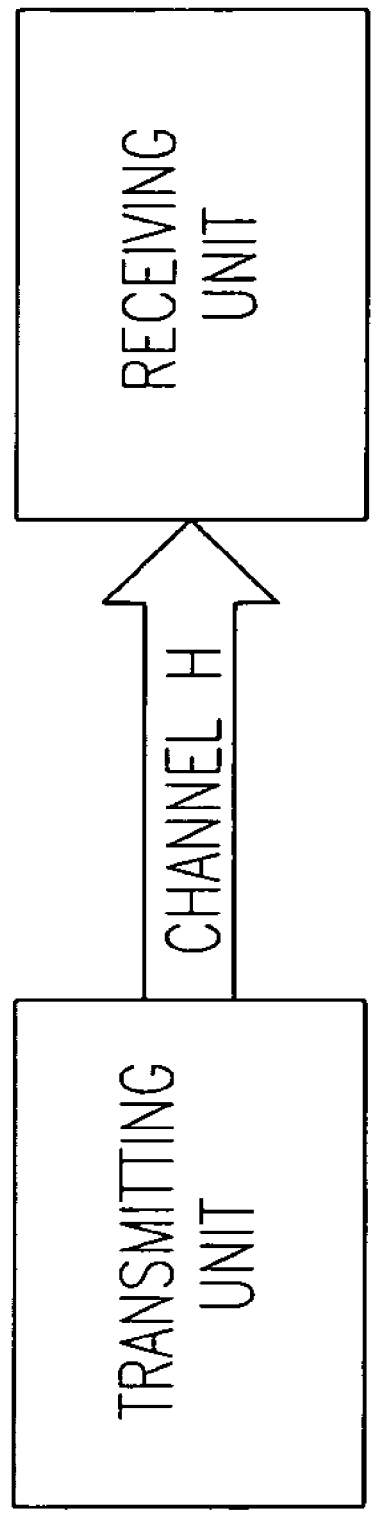
FIG. 1 is a block diagram showing data transmission between a transmitting unit and a receiving unit in accordance with the present invention.

With reference to FIG. 1, the block diagram illustrates data symbols are transmitted in a frequency domain from a transmitting unit to a receiving unit via a channel, i.e. said multi-carrier system. Data symbols intended to be transmitted are denominated as the "original data symbols" and represented with $X_k[n]$, where the subscript "k" is the subchannel index and "n" is the discrete time index. Since data symbols may be influenced by channel noise during the transmission, these received data symbols at the receiving unit are defined as "actual received data symbols" and represented by $R_k[n]$. These actual received data symbols can be further expressed by an equation $R_k[n]=H_k \cdot X_k[n]+N_k[n]$, where $H_k$ is the frequency domain channel response value of the $k^{th}$ subchannel, and $N_k$ is the noise quantity.

Figure 2:
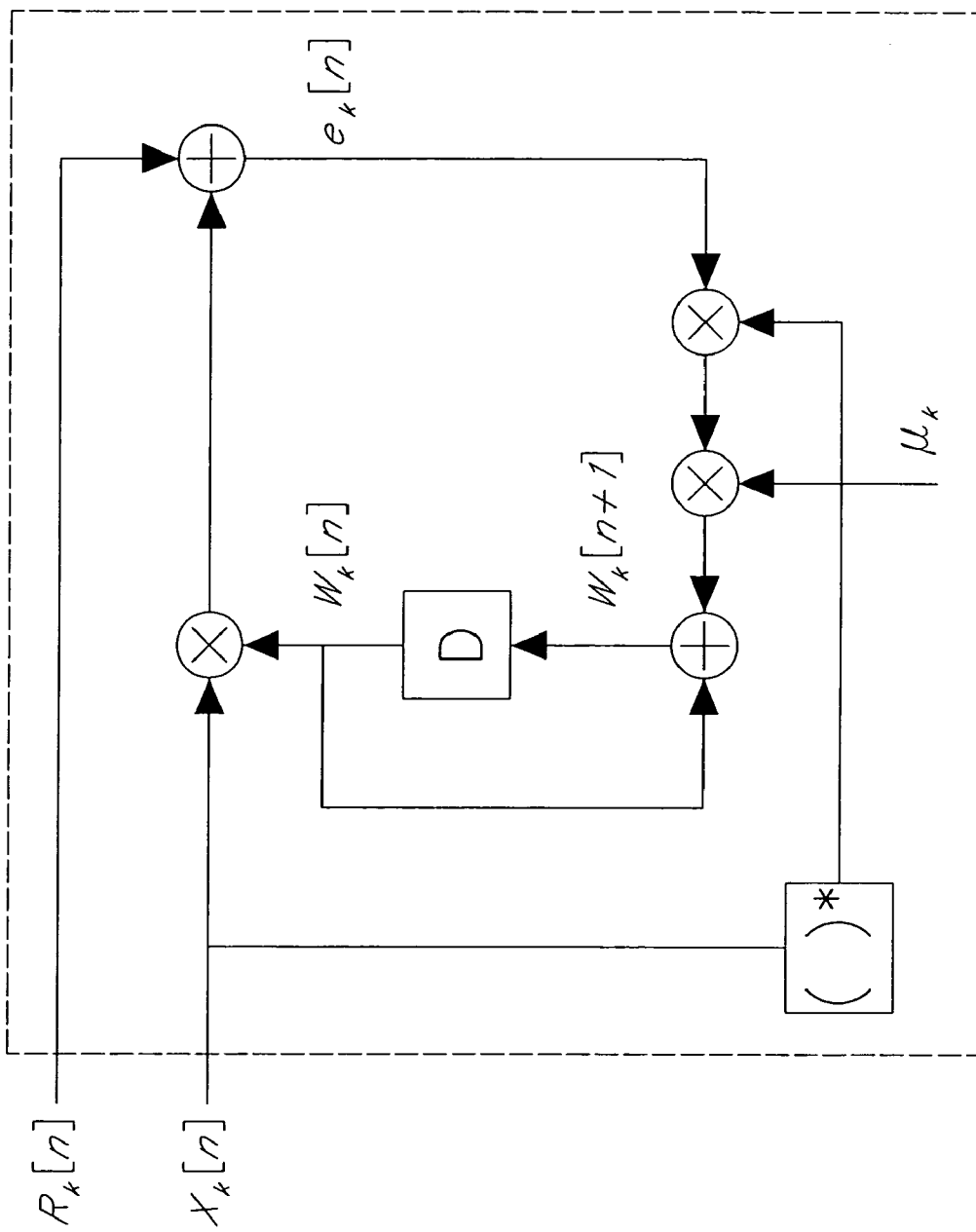
FIG. 2 illustrates a scheme of the LMS algorithm.

An essential parameter involved in the channel noise estimation of the present invention is the channel response value, which is calculated by a known adaptation algorithm named Least Mean Square (LMS) algorithm. As shown in FIG. 2, the LMS algorithm needs two kinds of parameter, i.e. $R_k[n]$ and $X_k[n]$, to calculate a channel response estimate $W_k[n]$ of a channel. An equation representing the channel response estimate $W_k[n]$ is $W_k[n+1]=W_k[n]+\mu_k \cdot e_k[n] \cdot (X_k[n])^*$, where $\mu_k$ is the adaptation coeficient.

Figure 3:
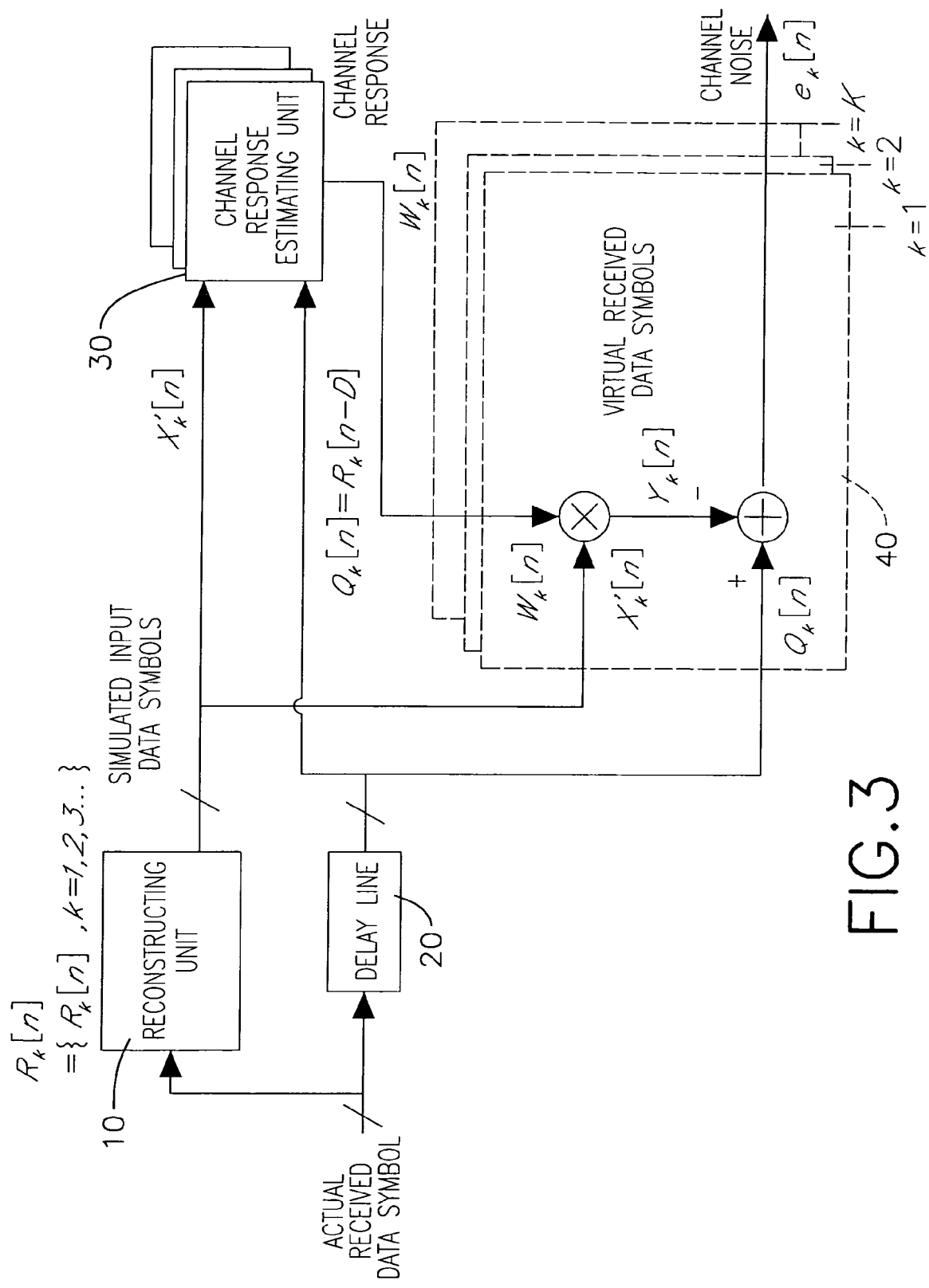
FIG. 3 is a block diagram of a channel noise estimating apparatus of the present invention.

With reference to FIG. 3, the channel noise estimation method is implemented by the apparatus as shown based on said actual received data symbols $R_k[n]$. The apparatus includes a reconstructing unit (10), a D-tap delay line (20), multiple channel response estimating units (30) and channel noise calculating units (40), where each channel response estimating unit (30) and each channel noise calculating unit (40) is corresponded to a respective subchannel. Logically, the noise quantity of each subchannel is individually estimated by one respective channel response estimating unit

(30) and one channel noise calculating unit (40). However, since the structure of those channel response estimating units (30) are the same, they can be implemented by a single hardware circuitry to save the space. The same situation can also be applied to the channel noise calculating units (40).

For some kinds of particular signals, the original data symbols $X_k[n]$ are already known to the receiver, for example the pilot-tone signals. Thus, these original data symbols $X_k[n]$ are directly used as input parameters applied to the LMS algorithm. However, in general, these original data symbols $X_k[n]$ are unable to be exactly measured for the receiver. Therefore, the present invention utilizes the reconstructing unit (10) to simulate the actual input data symbols $X_k[n]$ based on the actual received data symbols $R_k[n]$. The simulated input data symbols are represented by $X'_k[n]$.

With reference to FIG. 4, if the original data symbols $X_k[n]$ are already known to the receiver, the known original data symbols $X_k[n]$ is just used as the simulated input data symbols $X'_k[n]$. Otherwise, as shown in FIG. 5, the actual received data symbols $R_k[n]$ are input to the reconstructing unit (10) to derive the simulated input data symbols $X'_k[n]$, wherein the reconstructing unit (10) is composed of a bit-stream data extractor (11) and a constructor (12).

Figure 6A:
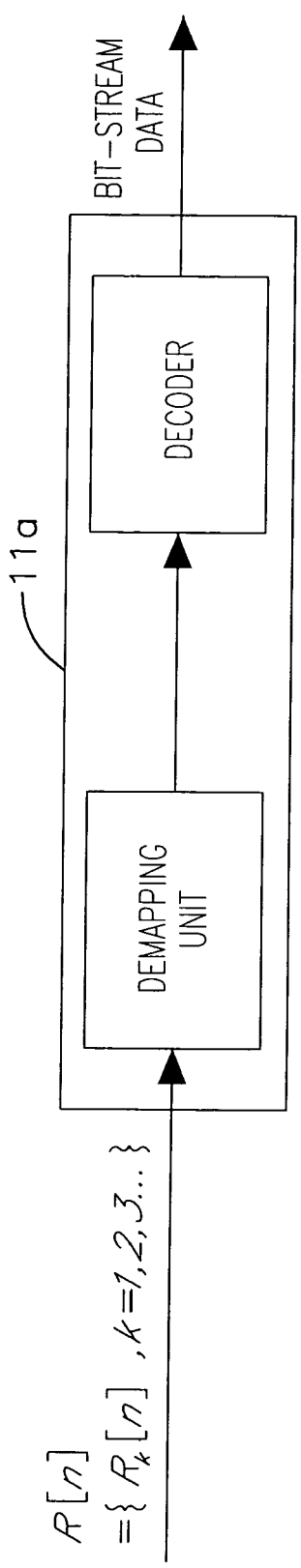
FIG. 6A is a first embodiment of a bit-stream data extractor in accordance with the present invention.
Figure 7A:
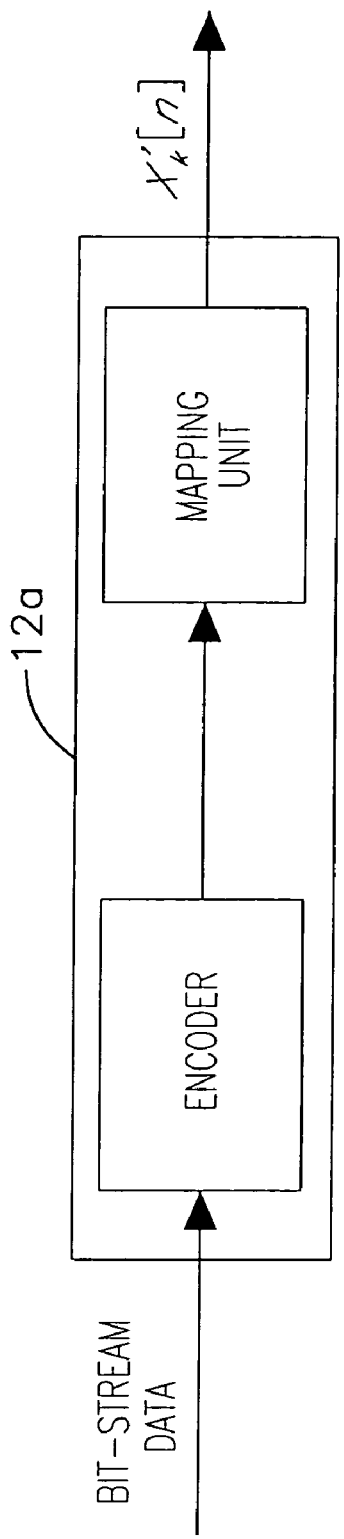
FIG. 7A is a first embodiment of a constructor in accordance with the present invention.

With reference to FIG. 6A, a first embodiment of the bit-stream data extractor (11a) provides a de-mapping unit and a decoder to convert the actual received data symbols $R_k[n]$ into the form of bit-stream data. The bit-stream data are then transmitted to the constructor (12a) as shown in FIG. 7A. The process of the constructor (12a) is a substantial reverse operation in comparison with the bit-stream data extractor (11a), where the constructor (12a) comprises an encoder and a mapping unit.

Figure 6B:
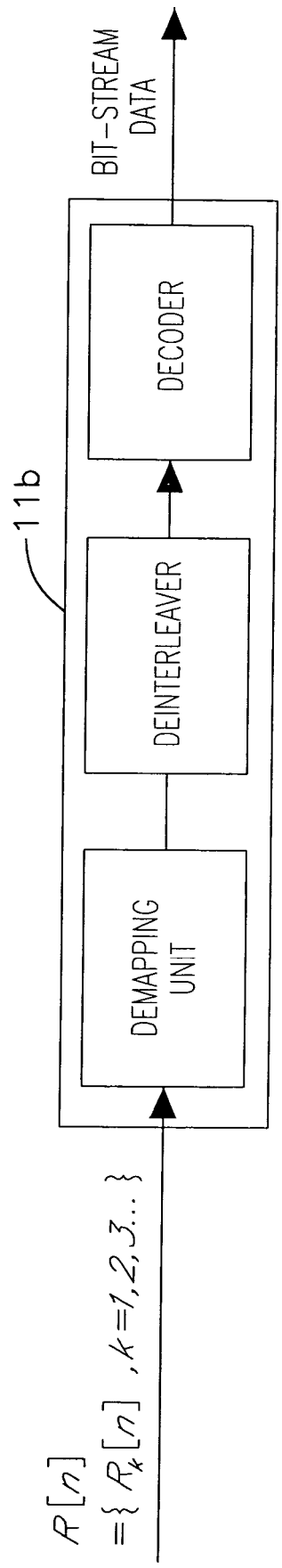
FIG. 6B is a second embodiment of the bit-stream data extractor in accordance with the present invention.
Figure 7B:
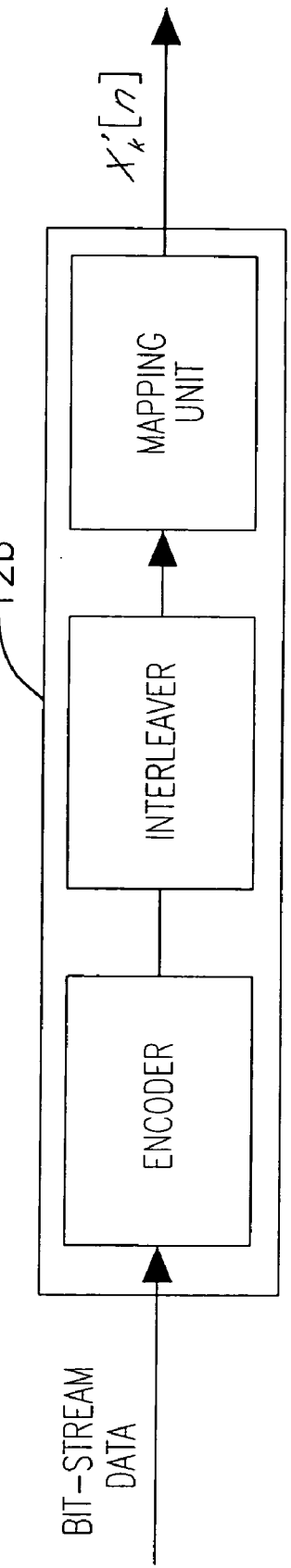
FIG. 7B is a second embodiment of the constructor in accordance with the present invention.
Figure 8:
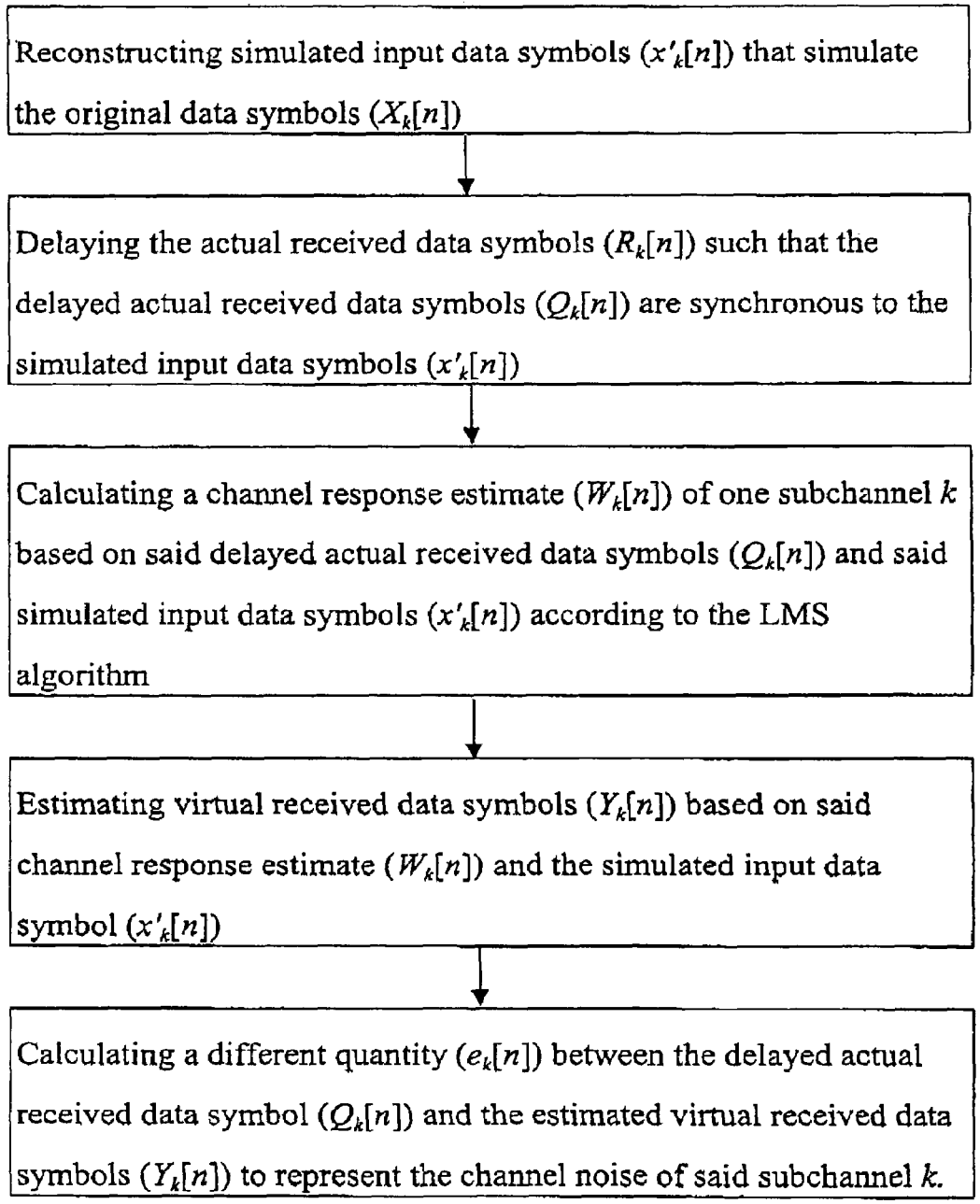
FIG. 8 is a flow chart of a channel noise estimating method in accordance with the present invention.
Figure 9:
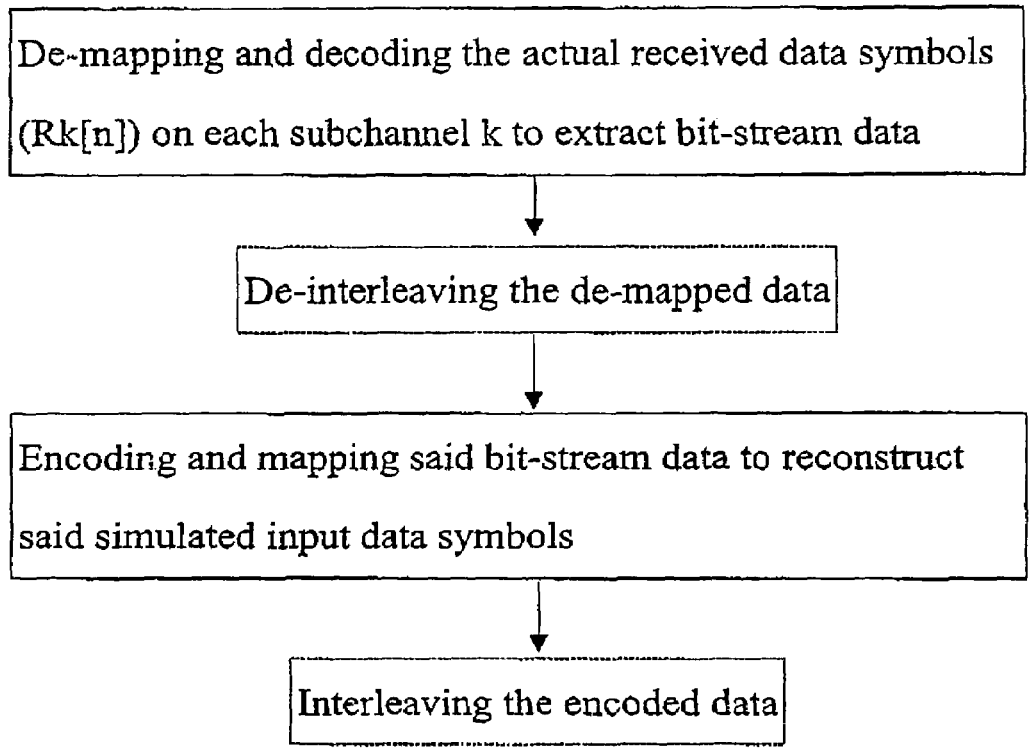
FIG. 9 is a flow chart of detailed steps of reconstructing simulated input data symbols in accordance with the present invention.

With reference to FIGS. 6B and 7B, a second embodiment of the bit-stream data extractor (11b) and the constructor (12b) are respectively shown. The difference is that a de-interleaver is inserted between the de-mapping unit and the decoder in the bit-stream data extractor (11b). Accordingly, an interleaver is provided in the constructor (12b).

With reference to FIG. 3, because the reconstructing process of the simulated input data symbols $X'_k[n]$ would take a short time, the simulated input data symbols $X'_k[n]$ would be slightly delayed for a span. To accurately match the simulated input data symbols $X'_k[n]$ with the actual received data symbols $R_k[n]$, the D-tap delay line (20) is provided to delay said actual received data symbols $R_k[n]$ with D intervals, where D is an integer greater than or equal to zero.

With the simulated input data symbols $X'_k[n]$ and the delayed actual received data symbols $Q_k[n]$, the channel response estimating unit (30) calculates the channel response estimate $W_k[n]$ of the subchannel k according to the LMS algorithm. The channel response estimate $W_k[n]$ in company with the simulated input data symbols $X'_k[n]$ is then adopted by the channel noise calculating unit (40) to estimate virtual received data symbols $Y_k[n]$. By comparing the calculated virtual received data symbols $Y_k[n]$ with the delayed actual received data symbols $Q_k[n]$, the different quantity $e_k[n]$ therebetween is deemed as the channel noise of the subchannel k.

The reconstructing manner disclosed in FIGS. 6A, 6B, 7A and 7B is called "soft decision". Such a manner can ensure the simulated input data symbols $X'_k[n]$ are very similar to the original data symbols $X_k[n]$. A feasible alternate manner is called "hard-decision" in which the reconstructing unit (10) directly maps the actual received data symbols $R_k[n]$ to form the simulated input data symbols $X'_k[n]$ so as to accelerate the calculation speed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A channel noise estimating method applied to a multi-carrier system consisting of K subchannels over which original data symbols ($X_k[n]$) (where n is the discrete time index, $k \in \{1, 2, \ldots, K\}$ is the subchannel index) are transmitted in a frequency-domain from a transmitting unit to a receiving unit, the noise estimating method comprising the acts of:

reconstructing simulated input data symbols ($X'_k[n]$) that simulate the original data symbols ($X_k[n]$);

delaying the actual received data symbols ($R_k[n]$) such that the delayed actual received data symbols ($Q_k[n]$) are synchronous to the simulated input data symbols ($X'_k[n]$);

calculating a channel response estimate ($W_k[n]$) of one subchannel k based on said delayed actual received data symbols ($Q_k[n]$) and said simulated input data symbols ($X'_k[n]$) according to the Least Mean Square algorithm;

estimating virtual received data symbols ($Y_k[n]$) based on said channel response estimate ($W_k[n]$) and the simulated input data symbol ($X'_k[n]$); and calculating a different quantity ($e_k[n]$) between the delayed actual received data symbol ($Q_k[n]$) and the estimated virtual received data symbols ($Y_k[n]$) to represent the channel noise of said subchannel k.

2. The method as claimed in claim 1, in the simulated input data symbols ($X'_k[n]$) reconstructing act, the original data symbols ($X_k[n]$) being taken as the simulated input data symbols ($X'_k[n]$) while the original data symbols ($X_k[n]$) are exactly known to the receiving unit.

3. The method as claimed in claim 1, the simulated input data symbols ($X'_k[n]$) reconstructing act further having:

de-mapping and decoding the actual received data symbols ($R_k[n]$) on each subchannel k to extract bit-stream data; and encoding and mapping said bit-stream data to reconstruct said simulated input data symbols ($X'_k[n]$).

4. The method as claimed in claim 3, wherein the simulated input data symbols ($X'_k[n]$) reconstructing act further has a de-interleaving act after the actual received data symbols ($R_k[n]$) de-mapping act, and an interleaving act after the bit-stream data encoding act.

5. The method as claimed in claim 1, in the simulated input data symbols ($X'_k[n]$) reconstructing act, said actual received data symbols ($R[n]$) on the subchannel k being directly mapped to form the simulated input data symbol ($X'_k[n]$) for said subchannel k.

6. A channel noise estimating apparatus applied to a multi-carrier system consisting of K subchannels over which original data symbols ($X_k[n]$) (where n is the discrete time index, $k \in \{1, 2, \ldots, K\}$ is the subchannel index) are transmitted in a frequency-domain from a transmitting unit to a receiving unit, the noise estimating apparatus comprising:

a reconstructing unit for generating simulated input data symbols ($X'_k[n]$) that simulate the original data symbols ($X_k[n]$);

a D-tap delay line provided to delay actual received data symbols ($R_k[n]$) that are received by the receiving unit such that the delayed actual received data symbols ($Q_k[n]$) are synchronous to the simulated input data symbols ($X'_k[n]$), wherein D is an integer greater than or equal to zero;

a channel response estimating unit, which estimates a channel response estimate ($W_k[n]$) of one subchannel k based on said delayed actual received data symbols ($Q_k[n]$) and said simulated input data symbols ($X'_k[n]$) according to the Least Mean Square algorithm;

a channel noise calculating unit corresponding to said channel response estimating unit, where the channel noise calculating unit estimates virtual received data symbols ($Y_k[n]$) based on said channel response estimate ($W_k[n]$) and the simulated input data symbol ($X'_k[n]$);

wherein the channel noise calculating unit further calculates a different quantity ($e_k[n]$) between the delayed actual received data symbol ($Q_k[n]$) and the estimated virtual received data symbols ($Y_k[n]$) to represent the channel noise of said subchannel k.

7. The apparatus as claimed in claim 6, wherein while the original data symbols ($X_k[n]$) are exactly known to the receiving unit, the reconstructing unit takes the original data symbols ($X_k[n]$) as the simulated input data symbols ($X'_k[n]$), and the actual received data symbols are directly passed through the delay line without a delaying process.

8. The apparatus as claimed in claim 6, wherein the reconstructing unit based on the actual received data symbols $R_k[n]$ on each subchannel k generates simulated input data symbols ($X'_k[n]$).

9. The apparatus as claimed in claim 8, the reconstructing unit having:

a bit-stream data extractor, which de-maps and decodes the actual received data symbols $R_k[n]$ on each subchannel k to construct the bit-stream data of the actual received data symbol; and a constructor, which encodes, and maps said bit stream data to reconstruct said simulated input data symbols ($X'_k[n]$) for each subchannel k.

10. The apparatus as claimed in claim 9, said bit-stream data extractor further including a de-interleaver, and said constructor further including an interleaver.

11. The apparatus as claimed in claim 8, wherein the reconstructing unit directly maps said actual received data symbols ($R_k[n]$) on the subchannel k to form the simulated input data symbol ($X'_k[n]$) for said subchannel k.

* * * * *